United States Patent [19]

Stanton

[11] 4,322,744
[45] Mar. 30, 1982

[54] VIRTUAL SOUND SYSTEM FOR THE VISUALLY HANDICAPPED

[76] Inventor: Austin N. Stanton, 4240 Briar Creek La., Dallas, Tex. 75214

[21] Appl. No.: 106,508

[22] Filed: Dec. 26, 1979

[51] Int. Cl.³ .............................................. H04N 7/18
[52] U.S. Cl. .................................... 358/94; 179/1 G; 179/156 R; 434/116
[58] Field of Search .................. 358/94, 200, 901; 340/407; 367/116; 343/5 BL; 35/35 A; 179/156 R, 1 G, 1 GQ; 434/114, 116

[56] References Cited

U.S. PATENT DOCUMENTS

| | | | |
|---|---|---|---|
| 3,800,082 | 3/1974 | Fish | 358/94 |
| 3,907,434 | 9/1975 | Coles | 35/35 A |
| 3,993,407 | 11/1976 | Moricca et al. | 356/1 |
| 4,010,364 | 3/1977 | Fuwa | 358/200 |
| 4,037,328 | 7/1977 | Kuehn et al. | 340/407 |
| 4,113,984 | 9/1978 | Gilbert et al. | 179/1 GQ |
| 4,188,504 | 2/1980 | Kasuga et al. | 179/1 G |

FOREIGN PATENT DOCUMENTS 2741004  3/1979  Fed. Rep. of Germany ... 179/156 R

OTHER PUBLICATIONS

Fish—An Audio Display for the Blind—IEEE Trans on Biomedical Eng., vol. BME-23, #2, Mar. 1976, pp. 144-153.
Damaske—Head Related Two Channel Stereophony with Loudspeaker Reproduction—Jour. of Acoust. Soc., vol. 50, #4, Part II, 1971, pp. 1109-1115.
Roffler et al.—Factors that Influence the Localization of Sound in the Vertical Plane—Jour. of Acoust. Soc.—vol. 43, #6-1968, pp. 1255-1259.
Rastak—The Brain—Doubleday and Co.—1979, pp. 155-173.

Primary Examiner—Joseph A. Orsino, Jr.
Attorney, Agent, or Firm—Richards, Harris & Medlock

[57] ABSTRACT

A system for utilizing sensing abilities of human hearing, including horizontal and vertical directional acuity, to represent visual aspects of the environs by converting incoming signals to audio waves, transmitted in response to an array of electroacoustic transducers in a plane parallel to a medial plane and then to the ears. Translation by the subject of incoming sound waves to location of their source and apperception of intelligence, including speech, are normal functions of human hearing. In use of the present invention, no additional cerebral translations are involved. Additional information may be superposed by means of pitch, intensity, timbre, chords and arbitrary signals requiring very simple translations by the brain, which signals may thereby be interpreted as color, brightness, texture and/or distance.

10 Claims, 8 Drawing Figures

VIRTUAL SOUND SYSTEM FOR THE VISUALLY HANDICAPPED

TECHNICAL FIELD

This invention relates to augmentation of vision of those who have lost vision or have had their visual faculties diminished. It more particularly involves the production of a two dimensional analog in planes anterior to and parallel to the medial plane of three dimensional surroundings.

BACKGROUND

Sensory substitution advocates benefit from advances in science and technology in attempting to adapt the remaining faculties of the sensorially deprived to compensate for or replace diminished or lost faculties. The best hope lies in the use of senses having a bandwidth nearest the bandwidth of the lost faculty. The most promising approaches minimize the need for mental interpretation and translation.

Substitution of hearing for sight has received much attention since hearing has a bandwidth most nearly equal to that of sight. Mammals are accustomed to interpretation of sound in spatial relation to their surroundings. Prior efforts have largely been addressed to the analysis of the production of faithful reproduction of sound while considering the available sources and room acoustics. Analyses of the capabilities of the human ear have also been widely studied. Developments addressed to utilization of the ears have confined attention to the plane of the ears.

A given visual scene can be described as a three dimensional matrix in either Cartesian or polar coordinates. Paintings, drawings and photographs usually reduce the coordinates from three to two. Humans are so accustomed to a two coordinate representation that no new mental translations are required.

The present invention involves production of a two dimensional analog in the medial plane of three dimensional surroundings. A third dimension may be made available.

The invention involves effectively a vertical array of electroacoustic transducers, as at the corners of a picture frame, rather than horizontal arrays used in quadraphonic hi-fi.

It has been shown that virtual sound sources can be displaced at will in either or both the pinnal and medial planes. A hearer readily identifies the coordinates of such a virtual source. In accordance with this invention, inputs to several transducers are shifted in phase and/or amplitude in response to signals produced from the selected scan acquisition information.

DISCLOSURE OF THE INVENTION

In accordance with one embodiment of the invention a simple and inexpensive system is provided which is useful in teaching a deprivee to apprehend the position of a virtual sound source as representing a point in space ascertainable by digital contact and interioceptor signals denoting limb extension and direction. It may also be used as a rudimentary reading device.

A cursor is confined to motion in a generally plane surface related to a substantially vertical rectangular sound field produced by transducers at the corners thereof. Sounds emanating from the transducers are controlled by the cursor. The sounds are phase shifted as between one transducer and each of the three others to produce a sound (virtual) seeming to come from a location related to the position of the cursor.

Identification of the relation between the position of the cursor and the virtual sound source is made by the usual interpretations and requires no translational instruction or processing. For the partially sighted, or those progressively being deprived of sight, the cursor may be lighted and may contain an acoustic transducer.

With a further embodiment, a subject may read, apprehend distance, color, brightness, texture or discontinuity of any of these facts. The cursor may be a fiber optic bundle, an array of tactile, optical or magnetic sensors, a directable light or sound source matched with appropriate sensors mounted on the head. Sound signals may return from the directed source after reflection from the components of the surroundings, or they may emanate from the sound field; or from vertically arrayed quadraphonic headphones.

Further, individuals may be able to apprehend the significance of several virtual sound sources simultaneously provided, or sequentially provided in rapid repetition. The rich spectrum of sounds customarily enjoyed by the ears may be translated into useful meaning concerning their environs, thereby utilizing portions of the auditory bandwidth more nearly approaching that of sight. For example, pulse repetition rate may indicate distance, frequency may indicate color, and chords may indicate texture.

IN THE DRAWINGS

DESCRIPTION OF THE PREFERRED EMBODIMENTS

FIG. 1

Figure 1:
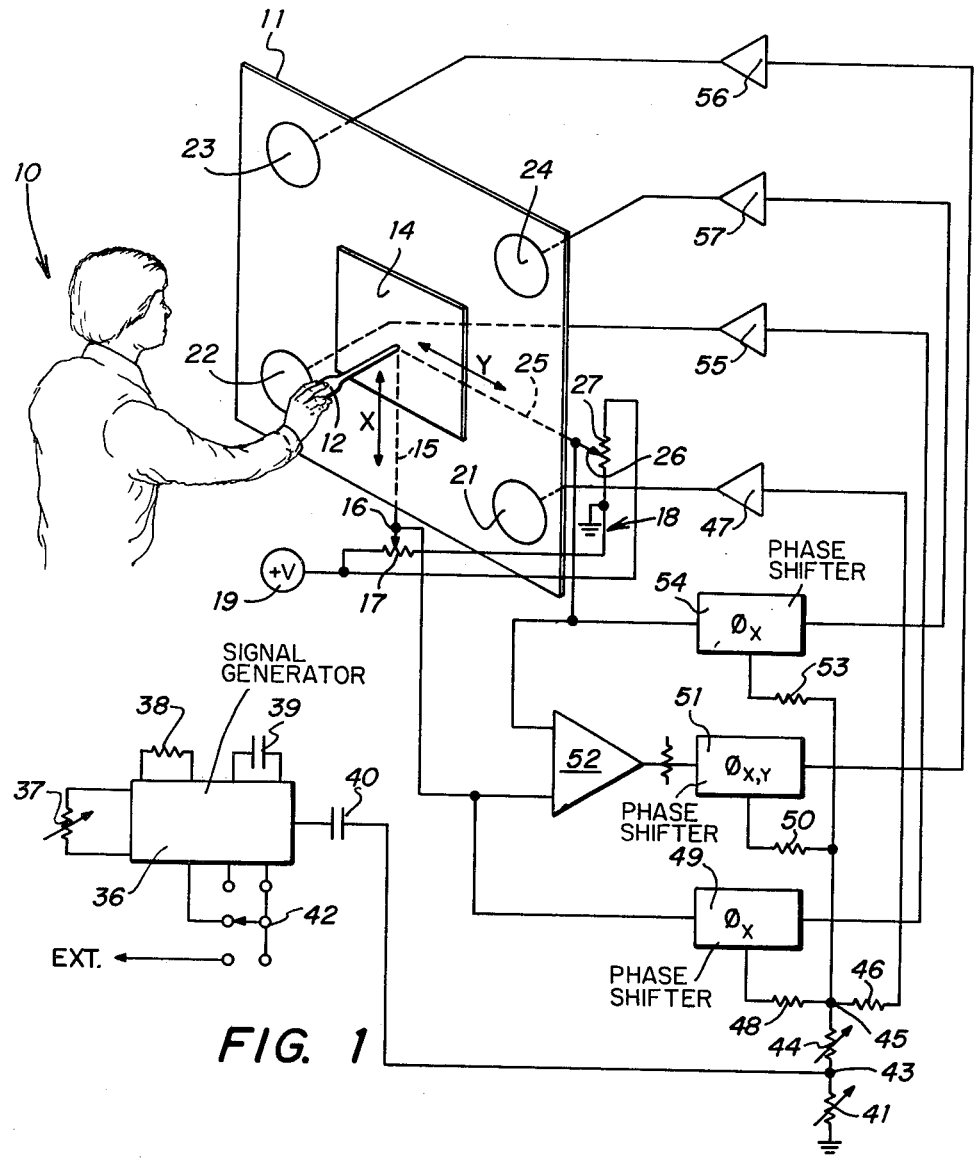
FIG. 1 illustrates an embodiment of the invention primarily related to teaching.

FIG. 1 illustrates a virtual sound system in a form to be used primarily for learning by one whose sight has been lost or impaired. A subject 10 may be seated as to face a vertical panel 11. Loud speakers are mounted at the corners of a rectangle on panel 11. In accordance with the present invention the subject 10, considered to be blind, would be instructed to move a cursor 12 in the plane of a control tablet 14. Tablet 14 may have a groove therein representing the outline of an object, the identity of which is to be interpreted by the subject 10 through the sounds emanating from transducers 21–24. Cursor 12 may be moved in either the X direction or the Y direction or both.

Cursor 12 is coupled by way of linkage 15 (simplified for clarity) to a wiper 16 on a potentiometer 17. One terminal of potentiometer 17 is connected to a ground terminal 18. The other terminal of potentiometer 17 is connected to a voltage source 19.

Cursor 12 is also connected by way of linkage 25 (simplified for clarity) to a wiper 26 on a potentiometer 27, one terminal of which is connected to ground point 18 and the other terminal of which is connected to the voltage source 19.

Voltages at the wipers 16 and 26 are dependent upon the position of cursor 12 as it is moved about by the subject 10. The voltages are used to control the phase, and if desired, the amplitude, of audio signals applied to the transducers 21-24 so that the virtual image of the source sensed by the subject 10 will move in the plane of the transducers 21-24 to represent movement of the cursor 12 in the plane of the tablet 14. By this means the subject 10 can trace a rectangle formed in tablet 14 and immediately sense the variations in sound from transducers 21-24, thereby to directly recognize the rectangular shape traced out on tablet 14. A circle, triangle, letters of the alphabet, numerals or other designs can thus be provided on suitable tablets so that the subject 10 may come to recognize shapes in terms of variations in position of a virtual source in a vertical plane facing subject 10.

In FIG. 1, a complex sound generator 36 may be employed, of the type manufactured and sold by Texas Instruments, Dallas, Tex. and identified as TI SN-76477. Such a generator is programmed to produce the desired training signal, the unit being provided with suitable control resistors 37, 38 and capacitor 39. The output signal from generator 36 is provided by way of a capacitor 40. In most suitable form for training purposes the signal is a pure tone between 500 and 2000 Hz as may be controlled by variable resistor 37. In other cases the signal may comprise filtered pseudo-random white noise filtered by resistor 38 and capacitor 39 and the RC network formed by capacitor 40 and resistor 41. Switch 42 is provided in generator 36 to enable selection of either the pure tone signal or the filtered pseudo-random which may be noise signal. Switch 42 also provides access for signals from other sources.

The signal from generator 36 as it appears at the output point 43 is then applied by way of a gain control potentiometer 44 to a signal feed point 45. The signal at point 45 is then applied by way of resistor 46 and amplifier 47 to transducer 21. The signal at point 45 is applied by way of resistor 48 to a phase shift unit 49, the control signal of which is supplied from wiper 16. The signal at point 45 is also connected by way of resistor 50 to a phase shift unit 51, the input signal of which is supplied by way of a differential amplifier 52. The input to differential amplifier 52 is supplied from wipers 16 and 26. The signal at point 45 is also applied by way of resistor 53 to a phase shift unit 54, the input signal of which is supplied from wiper 26. Phase shift unit 49 drives output amplifier 55 which is connected to transducer 22. Phase shift unit 51 drives output amplifier 56, which is connected to transducer 23. Similarly, phase shift unit 54 drives amplifier 57, which is connected to transducer 24.

Amplifiers 47, 55, 56 and 57 may be relatively low-power (two watt) integrated circuit amplifiers which may supply ample power to transducers 21-24. Transducers 21-24 may be five-inch surface mounted loud speakers. Any set of four matched amplifier-speakers of modest power will suffice to handle the mid-range audio signals indicated above.

Transducers 21-24 are located in a vertically oriented plane, spaced from subject 10 by a distance at least two wave lengths from the subject 10 and with a spacing of at least one wave length between adjacent transducers. For the lowest frequency used of 1000 Hz, the dimensions would be two feet and a minimum of one foot, respectively.

Phase shifting units 49, 51 and 54 are quadrature phase shifters and may be voltage controlled units such as disclosed by Thomas in Journal of the Audio Engineering Society, Vol. 25, July 8, 1977.

FIG. 2

Figure 2:
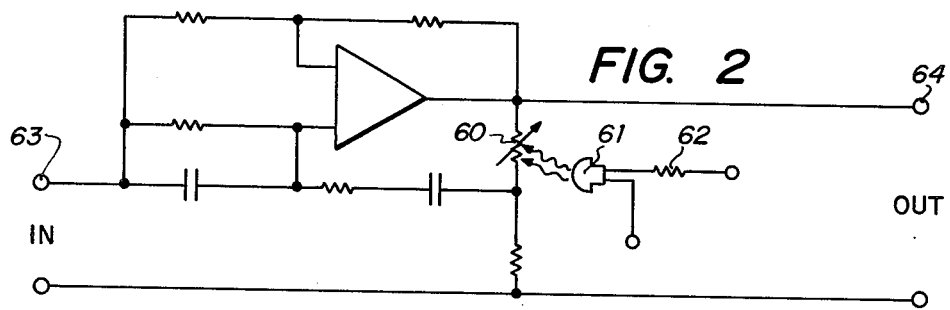
FIG. 2 illustrates one form of phase shifter employed in the system of FIG. 1.

Alternatively, the phase shifters may be of the type shown in FIG. 2 where the phase control resistor 60 is a voltage controlled resistor such as manufactured and sold by Raytheon and identified as catalog number CK-1103. Such a resistor is illuminated by a lamp 61 in series with a linearizing resistor 62 to provide a phase control in which the input signal at terminal 63 is varied in phase to produce the controlled phase output signal at terminal 64. By utilizing such a system as described in FIG. 1, the virtual sound source developed by excitation of transducers 21-24 may be controlled as to location at the will of the subject for training purposes.

FIGS. 3-5

Figure 3:
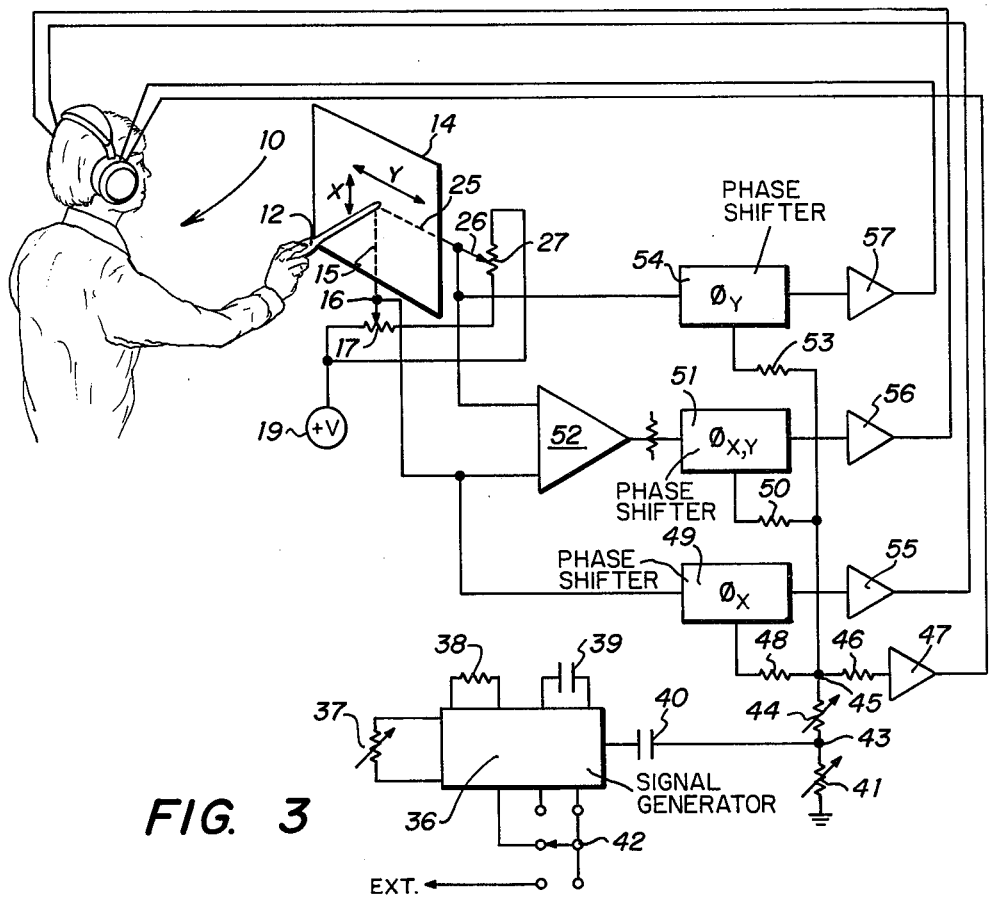
FIG. 3 illustrates the system of FIG. 1 with a quadraphonic earphone system replacing transducers 21–24 of FIG. 1.

FIG. 3 illustrates a system like that shown in FIG. 1. A unique quadraphonic headset is employed in place of the transducers 21-24. The headset includes four loudspeakers or transducers, two in each of two earphones. The earphones are supported in a conventional manner. The transducers in each earphone are oriented in a vertical plane directionally to transmit acoustic energy to the pinnal surfaces. The transducers are located forward of the ears and direct sound rearward to impinge the pinnal surfaces, thus simulating or achieving the same effect as the transducers 21-24 of FIG. 1.

Figure 4:
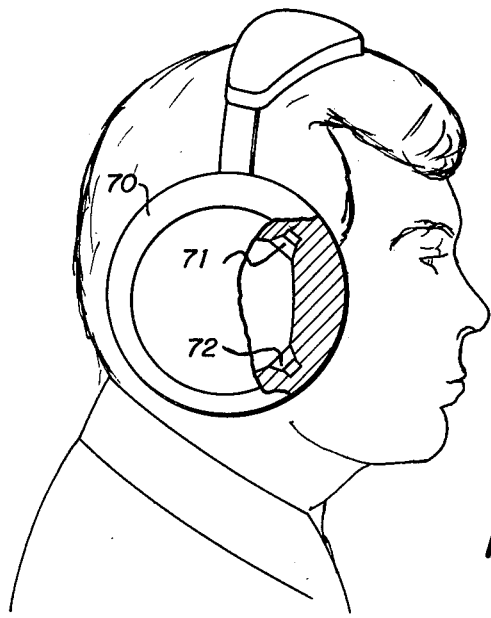
FIG. 4 is a side view of the subject of FIG. 3.

FIG. 4 is a side view of one of the earphones. Housing 70 forms a chamber to be closed by the side of the subject's head and encloses an ear substantially to exclude direct sounds. The inner front wall is spaced anterior to the pinna. Two transducers 71 and 72 are mounted on the inner front surface of the housing 70. Each transducer is capable of irradiating the entire pinna from its forward direction to provide vertically dissimilar sounds to the ear.

Figure 5:
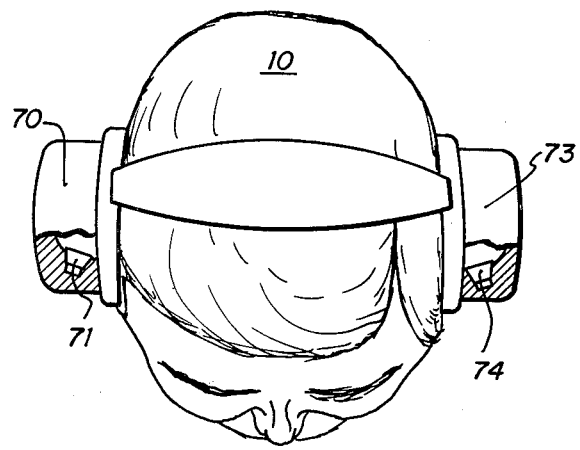
FIG. 5 is a top view of the subject of FIG. 3.

FIG. 5 is a top view of the subject of FIG. 4 showing the location and attitude of the unit 70 with the transducer 71 facing rearward and with a companion unit 73 having rearward facing transducers 74 and 75 (units 72 and 75 are not shown).

The system of FIGS. 3-5 is to be distinguished from conventional four channel headphones which address only the horizontal plane. With the two small transducers mounted one directly above the other and directly anterior of the pinna and radiating towards the pinna, the phaseably controlled sound allows the ear to exercise its ability to note the vertical component of the direction from which the sound appears to come. The enclosures 70 and 73 may be custom fitted to the ear or may be adjustably connected by a headband. The signals are applied to the transducers through conventional cord assemblies.

Figure 6:
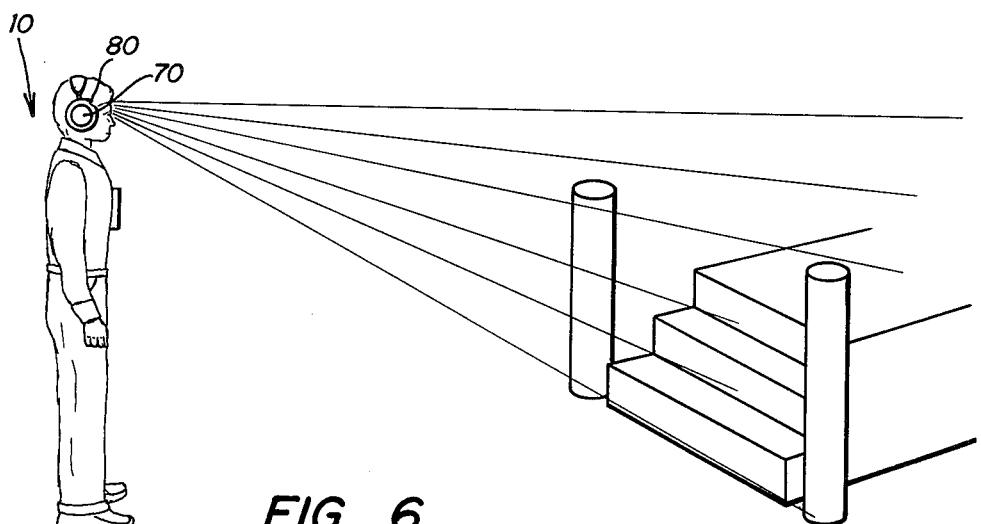
FIG. 6 illustrates an ambulatory sight augmentation system.
Figure 7:
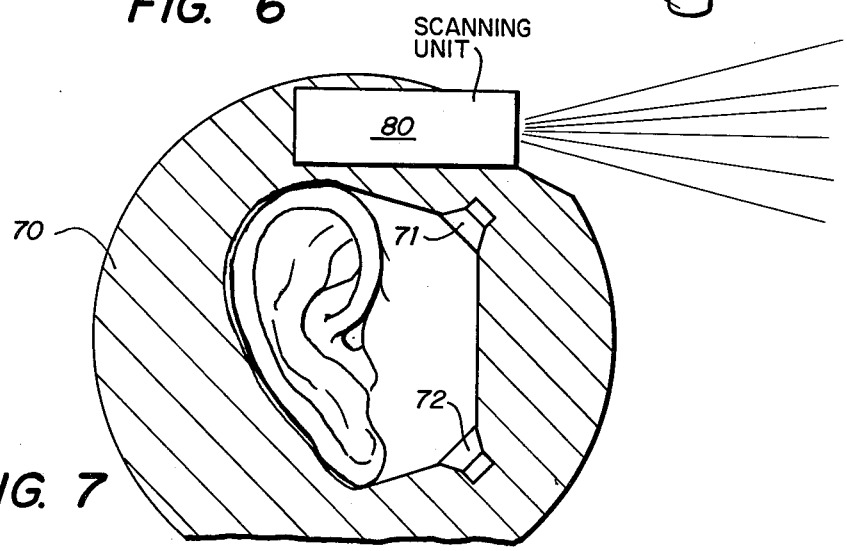
FIG. 7 is a side view of the earphones of FIG. 6.
Figure 8:
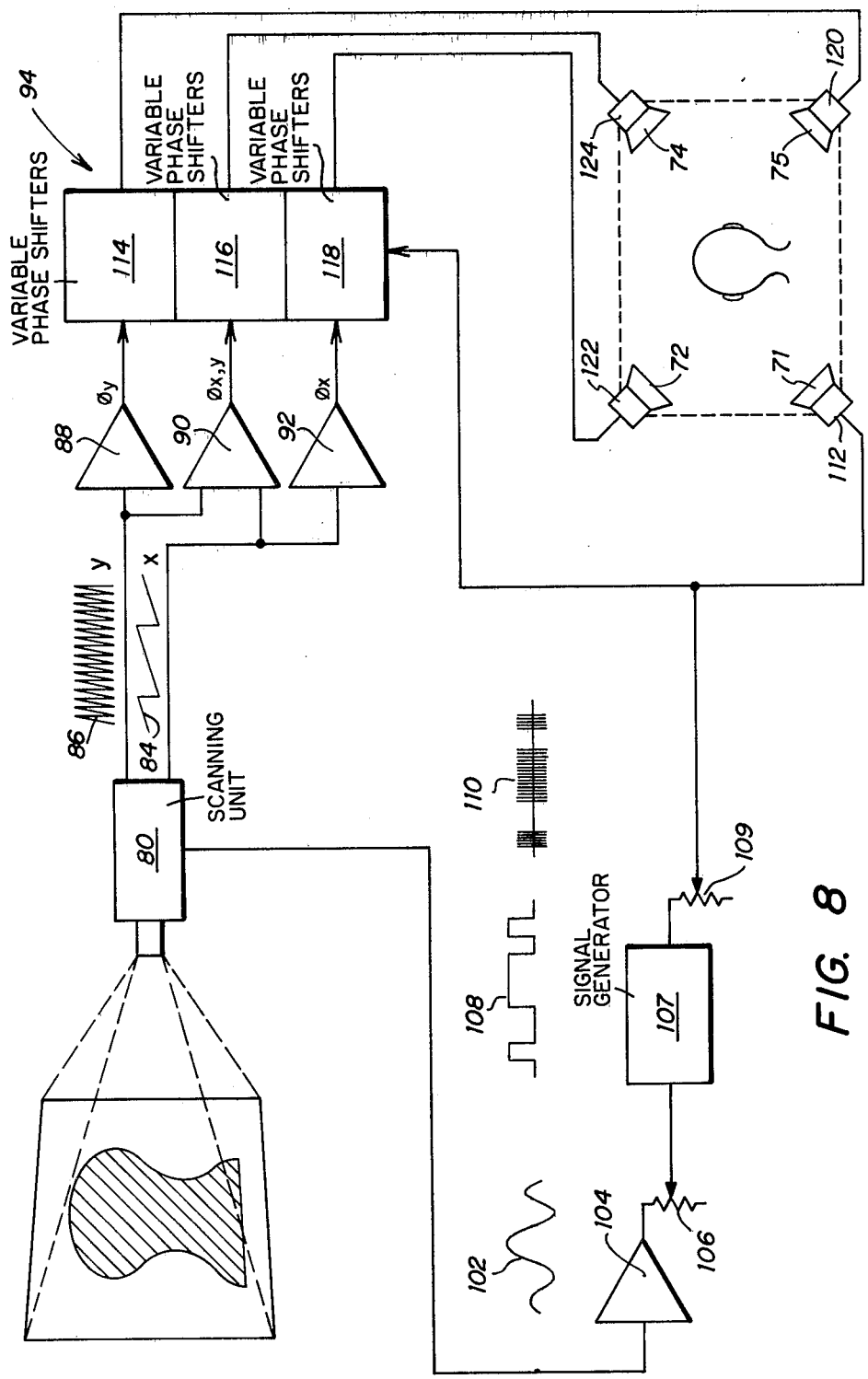
FIG. 8 is a schematic diagram of the ambulatory sight augmentation system of FIG. 6.

FIGS. 6, 7, and 8

FIG. 6 illustrates an embodiment of the invention in which an ambulatory subject is provided with augmentation for impaired sight.

In FIG. 6 the subject 10 is provided with earphone housings 70 and 73 (not shown) and is further provided with a forward scanning unit 80. The unit 80 is connected to drive the transducers in the housings 70 and 73 installed the same as shown in FIGS. 4 and 5. Subject 10 is able to discern the vertical components of the sound impinging the pinna. The scan unit 80 may be any one or several types of scanning devices. It may be a sonar type wherein unit 80 transmits and receives reflections of acoustic energy and translates the same for application to the vertaquadraphonic earphones of FIGS. 4 and 5. The scanner may be of the type in which a light field is scanned with signals being produced which are representative of the scene ahead of the subject for augmenting sight and providing signals to be interpreted in terms of the scene viewed by scanner 80. Thus, in this embodiment the input means of FIG. 1 is replaced by an automatic scanning means to provide an input which substantially depicts an area in the foreground of subject 10.

The object or scene to be sensed may be scanned by a modified Vidicon, incorporating a lens appropriate for the area. The modification comprises known elements and parameters, as disclosed by Fish, U.S. Pat. No. 3,800,082 (1974). For convenience, an aspect ratio of 3:4 (television standard) is employed, but the scan system is modified as follows: The vertical scan rate is a multiple of the horizontal scan. The latter may be referred to as the frame rate. In the audio bandwidth, up to 10,000 pixels may be accommodated; therefore a raster 100 lines wide may be used with a vertical scan rate of 100 per second and a horizontal rate of 1 per second. Thus, with a 3:4 aspect ratio, 75 elements are available for 100 horizontally and the pixel rate is 7500.

FIG. 8 illustrates wave forms 84 and 86, which are used for the horizontal and vertical scans of the Vidicon scanner unit 80, respectively, and in turn are conditioned by amplifiers 88, 90, and 92 to drive quadrature phase shifter 94, which is identical to the elements depicted in detail in FIG. 1.

The "video" (intensity modulation) is derived from the Vidicon scanner unit 80 and the resultant typical waveform 102 is applied to the linear amplifier 104. A potentiometer 106 controls the intensity modulation level applied to signal generator 107 in a manner as to provide bursts of audio signal. Wave form 108 is the internal control signal developed in generator 107 as a result of wave form 102, and wave form 110 and is the resultant audio signal-burst output. The bursts correspond to the presence or absence of light in each picture element scanned by the Vidicon unit 80. The potentiometer 106 is adjusted by the subject to optimize the signal response relative to the light level, and is analogous to setting the "black level" in a video system. Signal generator 107 was chosen because it combines the circuit components necessary to readily produce, select, and shape the desired audio signals in relation to the instantaneous intensity produced by Vidicon 80. Other known circuitry can provide similar functions.

The audio signal output of generator 107 is set to the desired auditory level by control 109 and routed to amplifier 112 directly and via variable phase shift networks 114, 116, and 118 to amplifiers 120, 122, and 124. Transducers 71, 72, 74 and 75 are disposed as previously described.

Although the system is described in terms of a two dimensional image, the addition of "depth" as a third dimension has been shown by Damske, Journal of the Acoustical Society of America, 50, 1109, (1971) to be psychoacoustically feasible. As an alternative to the system using a Vidicon above described, a one dimensional line array of photodiodes may be used. In such case, a phase shift system such as shown in FIG. 1 would respond to the automatic and continuous scan of the image and concurrently sweep the virtual sound in the vertical plane while horizontal scan is provided by the subject's action. Such a scanner would be mounted to move with the subject's head so that the field of view would always be that facing the subject.

In either case the scanner produces an audio signal modulated in proportion to the reflectance under each discrete element of the scanning means while the location of the signal is synchronously moved in the vertical axis.

I claim:

1. A system for audible assistance to the blind which comprises:
    means for mounting a plurality of loud speaker units so as to define a vertical plane with the speaker units oriented to directionally transmit acoustic energy primarily in one direction away from said plane;
    a signal source connected to drive one of said speakers;
    said signal source connected to the others of said speakers through separate phase control channels to drive said other speakers; and
    scan means movable in said plane of loud speaker units along coordinates defining said plane, said scan means being connected to vary the phase in said control channels in response to the coordinate position of said scan means to enable the virtual sound source developed by excitation of said speaker units to be controlled by the movement of said scan means.

2. The system of claim 1 and further comprising means for varying the amplitude of said signal source in said phase control channels connected to said other speakers.

3. The system of claim 1, wherein said signal source has a pure tone signal as a first output signal and a filtered pseudo-random white noise signal as a second output signal and a means to select said first or second output signal as the output of said signal source.

4. A system for assistance to the blind, comprising:
    a scanning means to produce scan signals which vary with the coordinates of a scan field of said scanning means, said scanning means detecting a reflected signal from shape features in said scan field;
    a signal generator connected to said scanning means for generating a reflection signal proportional to the reflected signal detected by said scanning means;
    at least four electro-acoustic transducers which are positioned in pairs in a vertical plane relative to a user's head;
    said signal generator connected to one of said electro-acoustic transducers and connected respectively through a plurality of phase shifting means to said other electro-acoustic transducers for transmitting said reflection signal to said transducers; and
    means connected to receive the scan signals for generating a plurality of different phase control signals which are supplied respectively to said phase shifting means to shift the phase of said reflection signal transmitted through a plurality of said phase shifting means as a function of the coordinates of the scan field determined by said scan signals, whereby virtual sound images are produced by said electro-acoustic transducers.

5. The device of claim 4, wherein said transducers are mounted in headphones.

6. The system of claim 4, wherein the scanning means is an optical-electronic camera.

7. The system of claim 4, wherein said scanning means is a scan directed light source and a photocell with an amplifier.

8. The system of claim 4, wherein said scanning means is a sonar transmitter and receiver.

9. The system of claim 4, wherein said scanning means and the transducers are mounted on the head.

10. The system of claim 4, wherein said scanning means is a fiberoptic bundle.

* * * * *